US012607996B1

(12) United States Patent
Dell'Omo et al.

(10) Patent No.: US 12,607,996 B1
(45) Date of Patent: Apr. 21, 2026

(54) LONGITUDINAL FAILURE ANALYSIS USING OBTAINED SENSOR DATA OF A PHYSICAL MACHINE

(71) Applicant: Tractian Technologies Inc, Atlanta, GA (US)

(72) Inventors: Canyon Grey Dell'Omo, Atlanta, GA (US); Lucas Custodio da Silva, Florianópolis (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/278,709

(22) Filed: Jul. 23, 2025

(51) Int. Cl.
*G05B 23/02* (2006.01)

(52) U.S. Cl.
CPC ..... *G05B 23/0283* (2013.01); *G05B 23/0221* (2013.01)

(58) Field of Classification Search
CPC ............ G05B 23/0283; G05B 23/0259; G05B 23/0205; G05B 23/02; G05B 23/00; G05B 23/0221; G05B 23/0218
See application file for complete search history.

(56) References Cited

U.S. PATENT DOCUMENTS

| | | | | |
|---|---|---|---|---|
| 2016/0371957 A1* | 12/2016 | Ghaffari | .................. | G01M 5/00 |
| 2018/0136085 A1* | 5/2018 | Lochry | .............. | G01M 5/0091 |
| 2019/0287005 A1* | 9/2019 | Subramaniyan | ......... | G06N 5/04 |
| 2020/0193234 A1* | 6/2020 | Pai | ........................ | G06F 16/904 |

* cited by examiner

*Primary Examiner* — Mohamed Charioui
(74) *Attorney, Agent, or Firm* — Cognition IP, P.C.; Edward Steakley

(57) ABSTRACT

An automated maintenance, monitoring and diagnostics infrastructure can include small, portable sensor devices, which can be attached to industrial machines and physical equipment. The sensor devices include wireless communication facilities and an accelerometer, capable of measuring vibration signals. Based on received sensor data, the system determines a condition state of the physical equipment and periodically evaluates additional data generated by the sensor device and determines an occurrence in a change of the condition state.

20 Claims, 12 Drawing Sheets

300

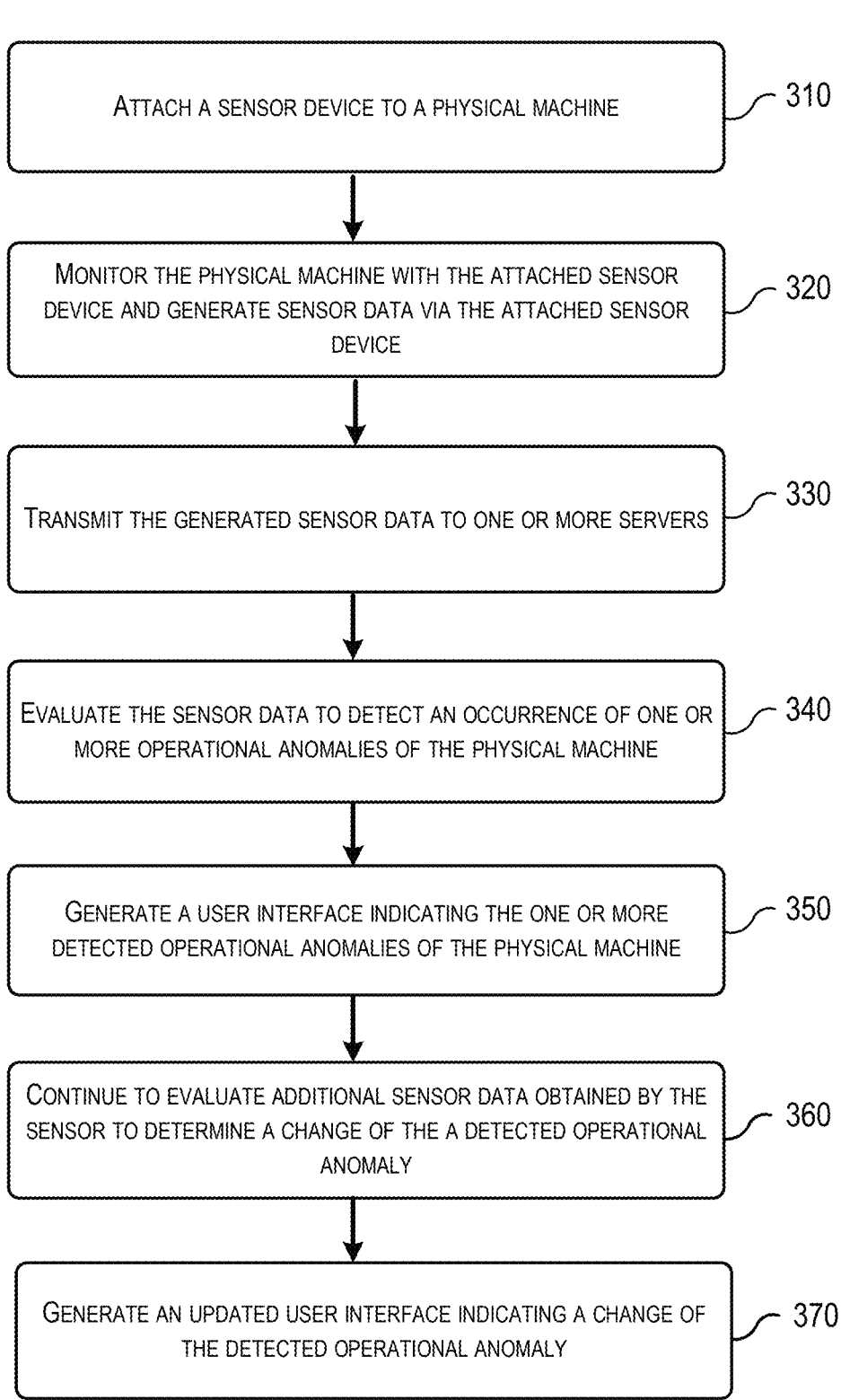

ATTACH A SENSOR DEVICE TO A PHYSICAL MACHINE — 310

MONITOR THE PHYSICAL MACHINE WITH THE ATTACHED SENSOR DEVICE AND GENERATE SENSOR DATA VIA THE ATTACHED SENSOR DEVICE — 320

TRANSMIT THE GENERATED SENSOR DATA TO ONE OR MORE SERVERS — 330

EVALUATE THE SENSOR DATA TO DETECT AN OCCURRENCE OF ONE OR MORE OPERATIONAL ANOMALIES OF THE PHYSICAL MACHINE — 340

GENERATE A USER INTERFACE INDICATING THE ONE OR MORE DETECTED OPERATIONAL ANOMALIES OF THE PHYSICAL MACHINE — 350

CONTINUE TO EVALUATE ADDITIONAL SENSOR DATA OBTAINED BY THE SENSOR TO DETERMINE A CHANGE OF THE A DETECTED OPERATIONAL ANOMALY — 360

GENERATE AN UPDATED USER INTERFACE INDICATING A CHANGE OF THE DETECTED OPERATIONAL ANOMALY — 370

Cavitation 🏷️
Fermentation / D17 Agitator

715 —| Danger for 1:39 hrs | ⓘ Pending |

720 —

Unbalance
Fermentation / D17 Agitator

725 —| Observe | ⓘ Pending |

730 —

Lubrication Problem
Fermentation / D17 Agitator

735 —| Worsening | ⓘ Pending |

740 —

Unbalance 🏷️
Fermentation / D17 Agitator

745 —| Improving | 🔍 In Inspection |

800

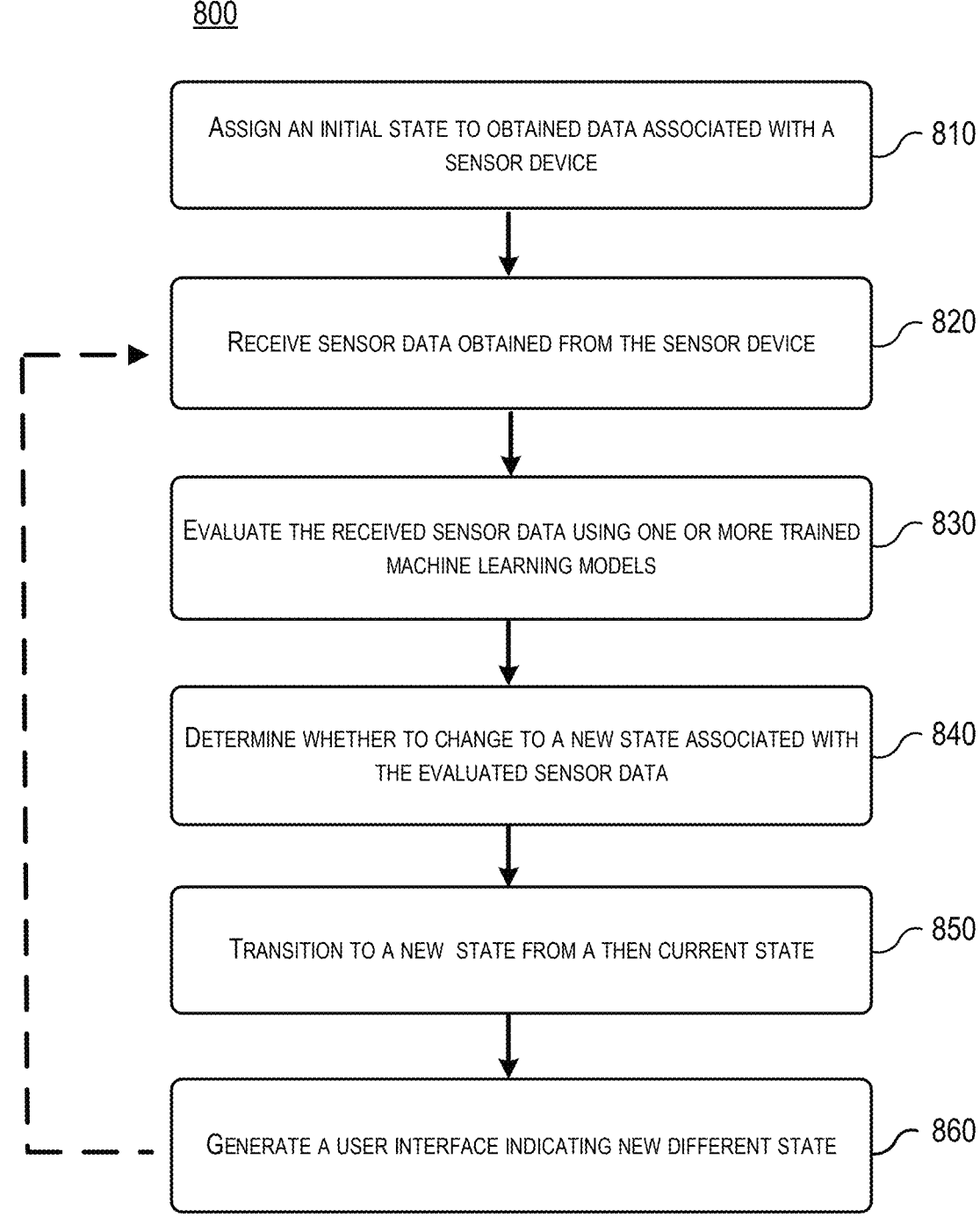

ASSIGN AN INITIAL STATE TO OBTAINED DATA ASSOCIATED WITH A SENSOR DEVICE — 810

RECEIVE SENSOR DATA OBTAINED FROM THE SENSOR DEVICE — 820

EVALUATE THE RECEIVED SENSOR DATA USING ONE OR MORE TRAINED MACHINE LEARNING MODELS — 830

DETERMINE WHETHER TO CHANGE TO A NEW STATE ASSOCIATED WITH THE EVALUATED SENSOR DATA — 840

TRANSITION TO A NEW STATE FROM A THEN CURRENT STATE — 850

GENERATE A USER INTERFACE INDICATING NEW DIFFERENT STATE — 860

| Current State | New State | Condition | Min. Time | Confidence |
|---|---|---|---|---|
| Observe | Worsening | Gradual Worsening | 24 hours | 65% |
| Observe | Danger | Abrupt Worsening | 2 hours | 90% |
| Observe | Improving | Clear Improvement | 48 hours | 50% |
| Worsening | Danger | Continued Worsening | 12 hours | 95% |
| Worsening | Observe | Stabilization | 72 hours | 65% |
| Danger | Worsening | Beginning of Improvement | 24 hours | 90% |
| Danger | Observe | Significant Improvement | 48 hours | 40% |
| Improving | Observe/Danger | Anomaly Return | 24 hours | 70% |

LONGITUDINAL FAILURE ANALYSIS USING OBTAINED SENSOR DATA OF A PHYSICAL MACHINE

CROSS-REFERENCE TO RELATED APPLICATIONS

None.

BACKGROUND

Field

This invention relates generally to the field of signal processing and more particularly to longitudinal failure analysis of physical machines.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Industrial plants can include numerous mechanical machines with thousands of moving parts. To increase the efficiency of plant operations, the machines can be monitored for maintenance purposes. Monitoring can include a trained technician visually inspecting the machines, observing the machine operations, and listening for any abnormal auditory cues that can indicate a present or potential maintenance-related fault in the machines. The technicians can also perform more sophisticated diagnosis, using maintenance and diagnostic tools. Continuous monitoring of industrial machines can present operational inefficiencies and cost to an industrial plant, particularly as the number of machines can be substantial in an industrial plant. For these and similar reasons, plants or busy shops with mechanical machines can benefit from an automated maintenance infrastructure. The automatic maintenance infrastructure can continuously collect maintenance-related data from various machines, detect maintenance-related events, and recommend appropriate action.

SUMMARY

In some embodiments, a monitoring system provides an automated maintenance, monitoring and diagnostics infrastructure that include sensor devices, which can be attached to industrial machines and physical equipment. The sensor devices include wireless communication facilities and an accelerometer, capable of measuring vibration signals. Based on received sensor data, the system determines a condition state of the physical equipment. The system then and periodically evaluates additional data generated by the sensor device and determines an occurrence in a change of the condition state to a different condition state.

In some embodiments, the monitoring system includes multiple sensor devices that are each attached to separate physical equipment. The multiple sensor devices each include an accelerometer and a thermal sensor. The sensor device attached to the physical equipment are configured to periodically generate sensor data and transmit the generated sensor data to a computing device. The generated sensor data may include a timestamp for each respective occurrences of the generated sensor data. The sensor device is configured to receive remote configuration files and/or commands to change the operational functionality of the sensor device.

In some embodiments, the monitoring system includes one or more servers that perform analysis of the generated sensor data. The one or more servers receive from each of the multiple sensor devices the sensor data generated by the attached sensor devices.

The system processes the received data and determines one or more anomalies associated with the monitored physical equipment. The system further determines one or more condition states associated with the monitored physical equipment.

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

FIG. 3 is a process flow chart illustrating an exemplary method 300 that may be performed in some embodiments.

FIG. 8 is a process flow chart illustrating an exemplary method 800 that may be performed in some embodiments.

FIG. 9 illustrates a table description exemplary equipment states and monitoring time for the condition state.

DETAILED DESCRIPTION

Figure 1A:
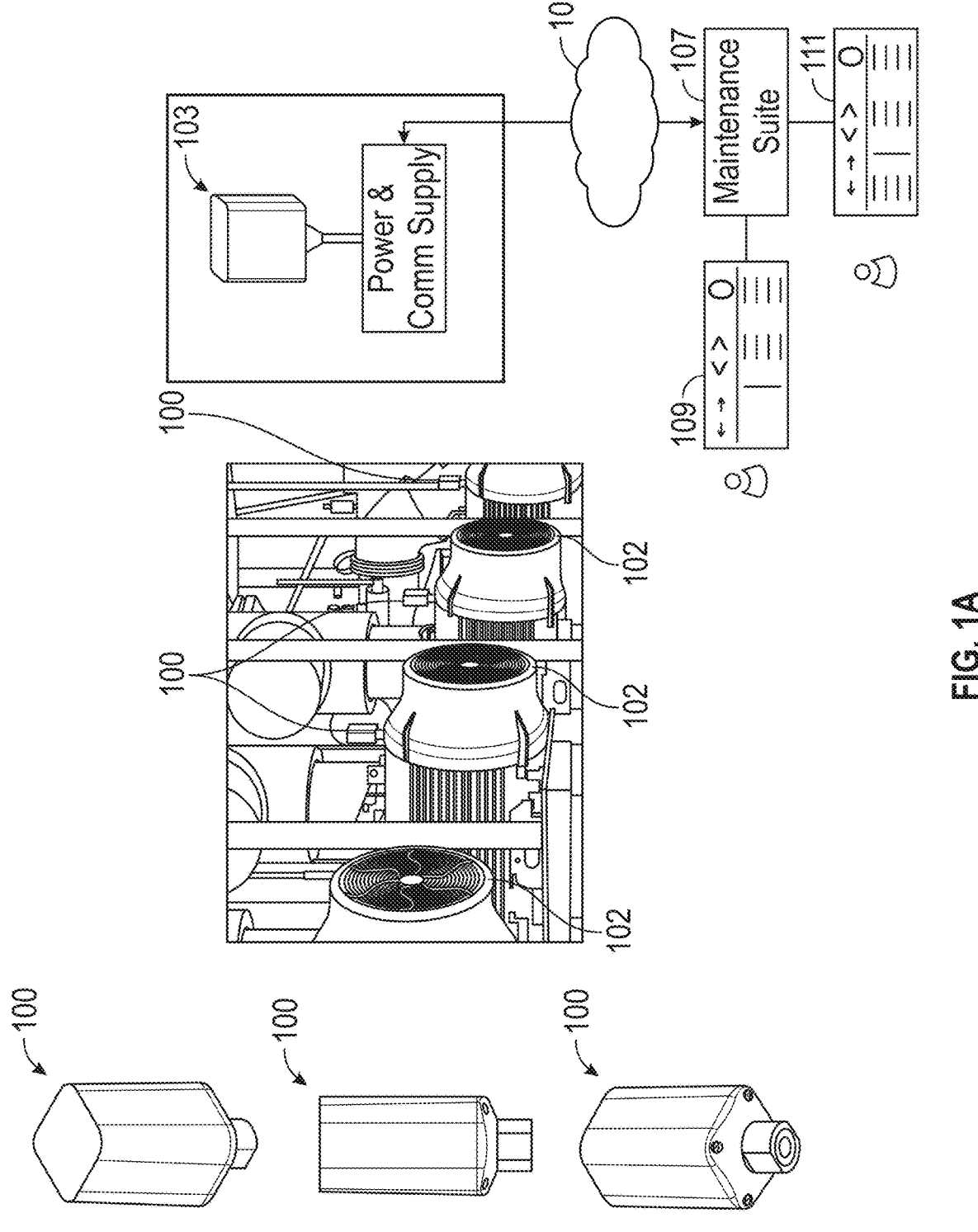
FIG. 1A illustrates example diagrams of a sensor device, industrial machines, and an infrastructure of fault monitoring and maintenance operations according to some embodiments.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well-known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include one or more processors, one or more memory devices, and one or more non-transitory computer-readable storage medium. The memory and non-transitory storage medium may store instructions, that when executed by the one or more processors perform the methods and steps described herein.

Industrial machines can benefit from consistent and accurate fault monitoring with artificial intelligence processing of the monitored data. In some embodiments, a plurality of small sensor device assemblies, each equipped with wireless communication circuitry can be attached to various industrial machines in a plant. The sensor devices can sense and report various operational parameters related to fault monitoring. For example, temperature and vibration can be monitored and reported. The quality of vibrations, vibration trend data and other characteristics can be indicators of fault occurring or developing in an industrial machine. Similarly, temperature and temperature trends of a machine can include indicators of occurring or upcoming faults in the machine.

FIG. 1A illustrates example diagrams of a sensor device 100, industrial machines 102, and an infrastructure of fault monitoring and maintenance operations according to some embodiments. The sensor device 100 can be battery operated and can include a variety of sensing components enclosed in a housing. The sensor device 100 can attach to machines 102 in the plant using a magnetic connection and/or by using other methods of attachment and fastening to secure the sensor devices 100 to machines 102 in the plant. The attachment of the sensor devices 100 to machines 102 can depend on the magnitude of the vibrations and other considerations related to the environment of the machines 102 and the plant. For example, if larger magnitude vibrations are expected, the connection between the sensor devices 100 and the machines 102 can be secured with an adhesive agent, so the sensor devices 100 can maintain their connections to the machines 102, despite large vibrations.

The sensor devices 100 can include wireless communication circuitry and can be in wireless communication with one or more receivers 103. In some embodiments, one or more sensor devices 100 can be modified to be in wired communication with a receiver 103 and have a connection to an outlet source of power. In other words, the source of power and a type of communication of the sensor devices 100 can be modified, depending on the application and the environment of the plant to include any combination of battery-operated, outlet-operated, wired communication, and wireless communication. Similarly, the receivers 103 can include both wired and wireless communication circuitry. The receivers 103 can also be powered with or without the use of a battery. In some embodiments, both the sensor devices 100 and the receivers 103 can wirelessly communicate to a portable computer, such as a laptop, a smart phone, a smart tablet, or other portable devices, in the field, using a local or cellular wireless network. Although the term receiver is used, the receivers 103 can also send data to sensor devices 100. Consequently, receivers 103 can be transceiver devices. For example, a receiver 103 can send a configuration file to a sensor device 100 to enable, disable or otherwise configure various operating parameters of the sensor device 100.

Both sensor devices 100 and receivers 103 can include processing and communication circuitry. For example, both sensor devices 100 and receivers 103 can include microprocessors, permanent and impermanent memory devices, and transceivers or equivalent devices. Sensor devices 100 and receivers 103 can perform various data processing when transmitting and/or receiving sensor data, and/or instructions and specifications data, related to their respective operations.

The numbers and locations of the receivers 103 can depend on the size of the plant and the numbers and distances of the sensor devices 100, relative to the receiver 103 and the wireless communication technology used to communicate between the sensor devices 100 and the receiver 103. The receivers 103 can be mounted at various locations in a plant and can have connection to a power and a communication source. For example, the receivers 103 in a plant can be in wired and/or wireless communication to one or more communication portals 105. Example communication portals 105 can include a local network, the Internet, one or more cloud infrastructures, gateways, other receivers 103, and other communication midpoints, or endpoints. The receivers 103 can transmit the fault monitoring data for upstream processing. The receivers 103 can also receive various operational configuration files, settings files, and/or other operating parameters and can transmit the operating parameters to the sensor devices 100. Examples operating parameters can include various timing and frequency of when and how the sensor devices 100 should collect data from the machines 102.

A maintenance suite 107 can receive monitoring data from the sensor devices 100 and perform processing related to fault monitoring and maintenance operations on the data. The maintenance suite 107 can include a variety of submodules and databases that can support processing of the monitoring data, including, storage of the data, generating reports from the data, extracting trends from the data, generating fault prediction from the data, generating maintenance action items, tickets, generating alerts, and/or other automated actions related to the maintenance of the machines 102. In some embodiments, the operations of the maintenance suite 107 can include artificial-intelligence submodules that can assist in fault prediction, maintenance recommendation pattern and trend detection, and other data analytics action, augmented or generated by artificial intelligence models. Example artificial intelligence techniques and/or models used by maintenance suite 107 can include neural networks, deep neural networks, machine learning, convolutional neural networks (CNNs), random forests, and others.

The maintenance suite 107 can support a variety of user interfaces (UIs). For example, the maintenance suite 107 can support a frontend user interface 109 and a backend user interface 111. Various parameters related to the operation of the sensor devices 100 can be viewed and/or modified via the user interfaces 109, 111. The user interfaces 109, 111 can provide access for a user to generate or modify configuration files, settings and operating parameters for the sensor devices 100 and the maintenance suite 107. The users can also view the output of the maintenance suite 107 via the user interfaces 109, 111. In some implementations, a user who is a customer of the maintenance suite 107, for example, a plant maintenance department, can have access to the maintenance suite 107 via the frontend user interface 109, while the administrators and engineers of the maintenance suite 107, can internally access the maintenance suite 107, via the backend user interface 111.

While not shown, the sensor devices 100 are not the only maintenance-related in-field components operated by the maintenance suite 107. Other components associated with monitoring and maintenance of the machines 102 and the plant can also be in communication with the maintenance suite 107. For example, in some embodiments, energy management components, in communication with the maintenance suite 107, can monitor the power consumption of the machines 102 and the plant.

Depending on the size of an industrial plant, the sensor devices 100 can be numerous, for example in the hundreds or thousands. The maintenance suite 107 can streamline and track data from hundreds or thousands of machines 102 and automate the identification and tracking of maintenance-related tasks for a large industrial plant, having hundreds or thousands of machines 102.

Figure 1B:
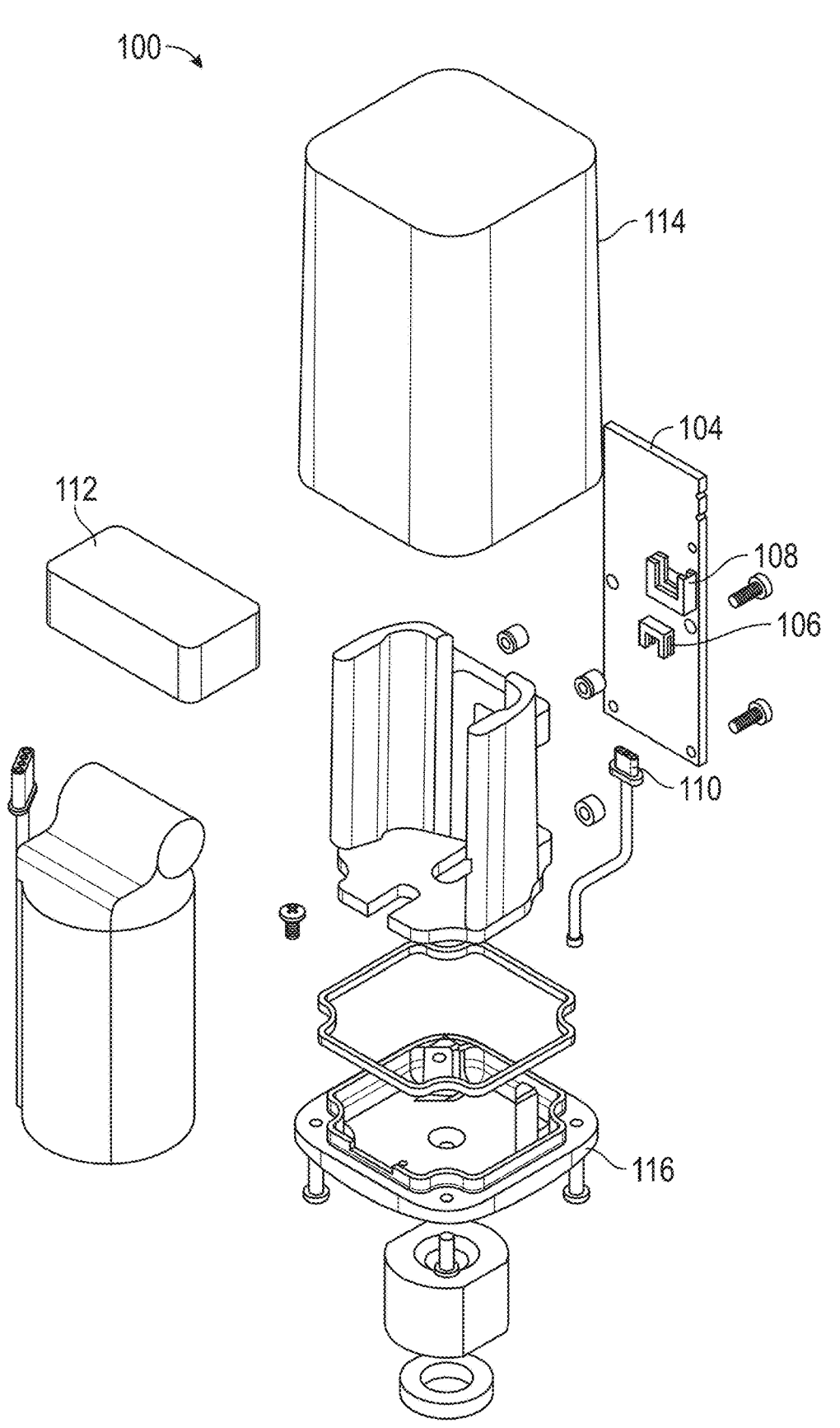
FIG. 1B illustrates an exploded view of the sensor device of the embodiment of FIG. 1A.

FIG. 1B illustrates an exploded view of a sensor device 100. Some example components include the printed circuit board (PCB) 104, the microcontroller 106, an accelerometer 108, a temperature sensor 110, a battery module 112, various spacers, holders, internal conduits, and a housing 114. The housing 114 can house the internal components of the sensor device 100. A housing lid 116 can enclose the housing 114 and seal the internal components of the sensor device 100 from the outside. The sensor device 100 can be made water-, dust- and particle-resistant by a variety of techniques. For example, in some implementations, the sensor device 100 can be resin-coated. The battery module 112 can include one or more lithium-ion batteries, and a battery management system (BMS). In other embodiments, the BMS can be external to the battery module 112, for example, it can be mounted on the PCB 104. In some embodiments, the life expectancy of the battery module 112 can be between three to five years. In some embodiments, the sensor device 100 can be manufactured using application-specific integrated circuit (ASIC) technology, in lieu of or in addition to using a PCB technology.

The sensor device 100 can include communication circuitry, corresponding to the communication circuitry of one or more receivers, for example, the receivers 103, and one or more local, private and/or public communication network, including one or more cellular networks. The choice of network and communication circuitry can depend on the size of the plant and the distance of the sensor device 100 from a receiver 103. The communication circuitry of the sensor device 100 can be mounted on the PCB 104. In some embodiments, the communication circuitry may be integrated in the microcontroller 106. Similarly, in other embodiments, various components can be combined into one or use a component that integrates several components together. On the other hand, some components, for example, the communication circuitry of the sensor device 100, can be a separate module, embedded on the PCB 104, or otherwise separately included in the sensor device 100. In some embodiments, the communication circuitry of the sensor device 100 can include a transceiver, as an independent component, or as an internal component of another component, such as the microcontroller 106. The microcontroller 106 can alternatively be referred to as a microprocessor or as a processor. In some implementations, the microcontroller 106 can include a plurality of processors. The sensor device 100 can include a magnetic collar to provide magnetic attachment between the sensor device 100 and the machine 102. In some embodiments, the temperature sensor 110 can be routed to a surface very near the point of contact between the sensor device 100 and the machine 102 to provide a more accurate reading of the temperature of the machine 102.

The accelerometer 108 can be a micro-electro-mechanical system (MEMS) accelerometer, capable of one, two, or three axis acceleration data. For example, in some embodiments, the accelerometer 108 can measure forces in three directions along the XYZ axes. The accelerometer 108 can measure and transmit both magnitude and spectral data of the vibrations of a machine 102 to the microcontroller 106. Consequently, the accelerometer 108 is capable of collecting the machine vibrations of the machine 102 in three directions, along the x-axis, the y-axis and the z-axis.

The microcontroller 106 can be a collection of various components, including computer or computing components. Example components of the microcontroller 106 can include a processor, or a microprocessor, such as a central processing unit (CPU), permanent and impermanent memory, including for example, random access memory (RAM) of various kinds, solid state, flash or other permanent memory, interconnects, buses and communication vias between the various components. In some embodiments, the microcontroller 106 can include external communication circuitry to enable wireless communication, including radio frequency identification (RFID), Bluetooth, cellular, or other communication technologies. In other embodiments the sensor device 100 can include dedicated wireless communication circuitry, fabricated or included in the sensor device 100, in a separate component than the microcontroller 106.

The sensor devices 100 can be configured to spend the majority of their time in hibernation state to conserve battery power. In hibernation mode, the power to all or some of the components of the sensor device 100 can be reduced or minimized, thereby reducing the overall battery consumption in the hibernation state. The sensor devices 100 can be configured to periodically exit hibernation mode and enter normal operation mode, where power and functionality to some or all components is restored. For example, the sensor devices 100 can perform periodic sampling of various operational parameters of the machines 102, such as temperature and vibrations. When scheduled sampling is not performed, the sensor devices 100 can be in hibernation mode. As an example, a sensor device 100 can collect vibration data for two-minutes at every ten-minute intervals. Frequency of sampling is an example of the operational specification and parameters that can be specified and used to configure the sensor device 100, accordingly.

The sensor devices 100 can perform a variety of samplings of machine operation parameters. For example, for the vibration parameter of the machines 102, the sensor devices 100 can perform various samplings at different intervals and with different characteristics. Example sampling characteristics can include sampling intervals, sampling frequency, sampling rate, sampling range, sampling resolution and other characteristics. Sampling interval can refer to the period by which the sensor device 100 turns ON and performs a sampling with a selected set of sampling characteristics. In some embodiments, the sensor devices 100 can be configured to perform scheduled sampling sessions, which are samplings performed at selected intervals. The selected intervals can depend on the type of machines 102 and other factors that are application-dependent, based on where the sensor devices 100 are used. Example sampling intervals can include sampling with intervals separated by minutes, hour or hours, days, or even months, and other intervals.

The sensor device 100 is a battery-operated device. In most applications extending the longevity of the sensor device 100 is proportional to the longevity of the battery module 112. A significant portion of the battery consumption of the sensor device 100 relates to the transmission of data to the receiver 103. In some implementations of the described infrastructure, the sensor device 100 can compress sensor data, and transmit a compressed data structure to the receiver 103, in order to increase the reliability of transmission and to reduce the battery consumption of the sensor device 100.

Figure 2:
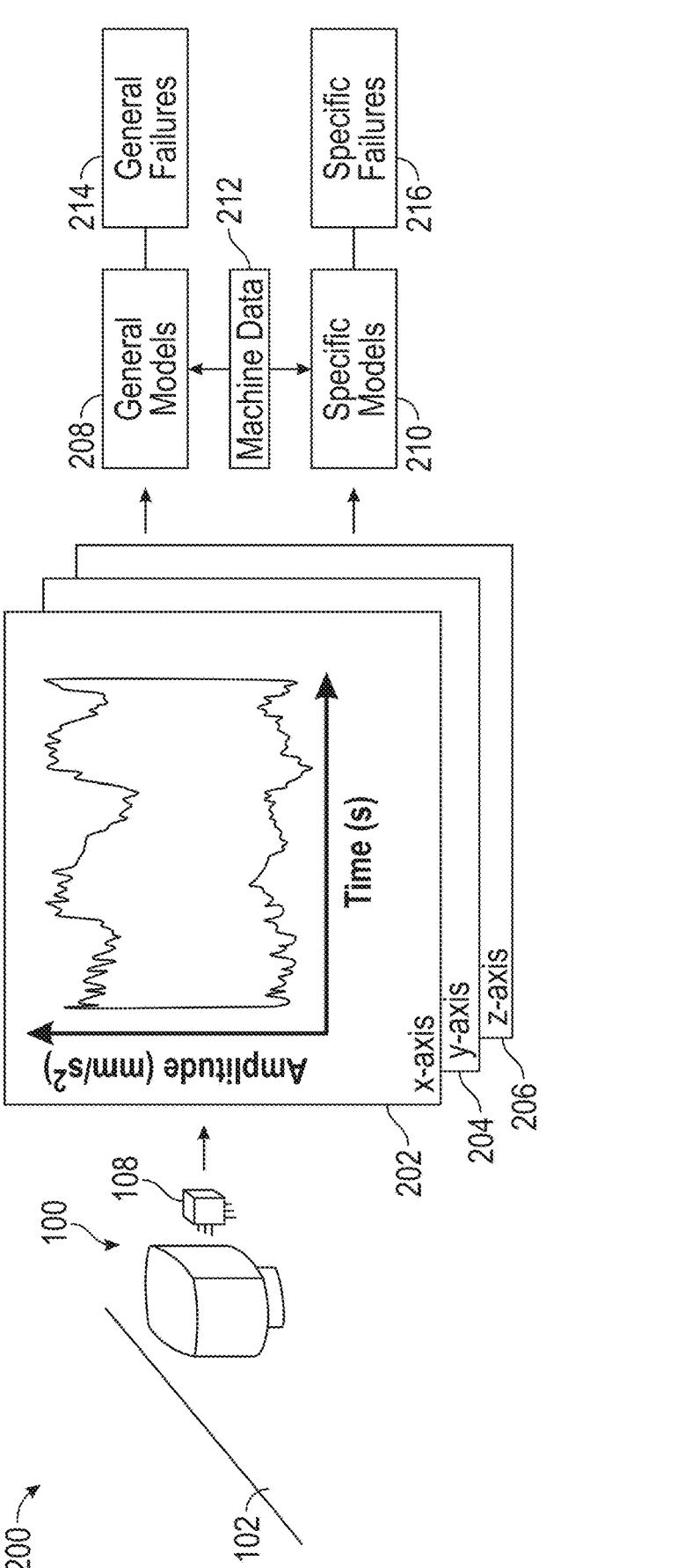
FIG. 2 illustrates a diagram of an example diagnostic workflow, according to an embodiment.

FIG. 2 illustrates a diagram 200 of an example diagnostic workflow, according to an embodiment. The sensor device 100 includes an accelerator 108, which can measure movements of the machine 102 in three directions, along the standard Cartesian coordinate system, the x-axis, the y-axis and the z-axis (the horizontal, the vertical and the depth, respectively). The accelerometer 108 measures and reports x-axis, y-axis and z-axis vibration signals 202, 204, 206. The vibration signals can be received by general models 208, which process the vibration signals and report general failures 214 about the machine 102. General failures 214 may include general diagnostic alerts that do not necessarily flag specific component failures. The vibration signals can also be received and processed by specific models 210, which can report specific failures 216 about the machine 102. Specific failures 216 may include diagnostic alerts flagging specific components of the machine 102. Both general and specific models 208, 210 can rely on machine data 212 to perform diagnostics. Machine data 212 can include machine expected operation specification and parameters, as provided by the manufacturer of the machine 102, an owner or operator of the machine 102, and/or from other sources external to the models 208, 210. The machine data 212 can include RPM data.

FIG. 3 is a process flow chart illustrating an exemplary method 300 that may be performed in some embodiments.

In step 310, a sensor device 100 is attached to a physical machine for monitoring vibration and/or temperature of the machine.

In step 320, the physical machine is monitored with the attached sensor device and the sensor device 100 generates sensor data. In some embodiments, the sensor devices generates, from an integrated accelerometer of a sensor device, three vibration signals. The three vibration signals include an x-axis vibration signal, a y-axis vibration signal and a z-axis vibration signal. The sensor device attached or in contact with the physical machine where the movements of the physical machine induces movements in the sensor device causing the accelerometer to record the three vibration signals, the vibration signals initially received in a time-domain. Additionally, the sensor device 100 generates temperature data of the physical equipment.

In step 330, periodically the sensor device 100 transmits the generated sensor data, via one or more networked routing devices, to one or more servers. In some embodiments, the one or more servers convert the received vibration signal data to a frequency domain, generating x-axis spectrum, y-axis spectrum and z-axis spectrum data.

In step 340, the one or more servers evaluate the generated sensor data and/or the converted spectrum data and detect an occurrence of one more operational anomalies of the physical machine.

In step 350, the system generates a user interface indicating the one or more detected operational anomalies of the physical machine.

In step 360, the system continues to evaluate additional sensor data obtained by the sensor device 100 to determine a change of a detected anomaly. In some embodiments, the one or more servers transmit one or more configuration files and/or other commands that are received by the sensor device. The one or more configuration files and/or other commands change operational functionality of the sensor device 100. For example, the sensor device, based on a received configuration file, may change the sampling frequency of the sensor device (such as obtain more or less samples every so many seconds or milliseconds), and may change the data transmission frequency (such transmitting obtained sample data more or less often). As a result of the change in operation to sensor device, the sensor data received by the system may include a higher or lower resolution of data. Where a higher resolution of data is obtained, the sensor necessarily uses more battery power. Where the sensor device 100 is instructed to obtain higher resolution data or higher sampling rates of data, these period of obtaining the higher resolution data or higher sampling rates of data may be defined, such as 30 seconds, 5 minutes, one hour, etc., and then after this defined period the sensor device automatically switches to obtaining lower resolution data or lower sampling rates of the data. In some embodiments, based on the particular type of detected operation anomaly of the physical machine, the configuration file and/or other commands to change the operational functionality may be generated by the system and transmitted to the sensor device. Thus, changing the resolution of data and/or sampling rate being obtained by the sensor device such that additional detailed analysis of the obtained data may be performed by the system to further assess or evaluate the one or more detected operational anomalies of the physical machine.

In step 370, the system based on the continued evaluation of the additional sensor data, generates an updated user interface indicating a change of the detected one or more operational anomalies.

Figure 4:
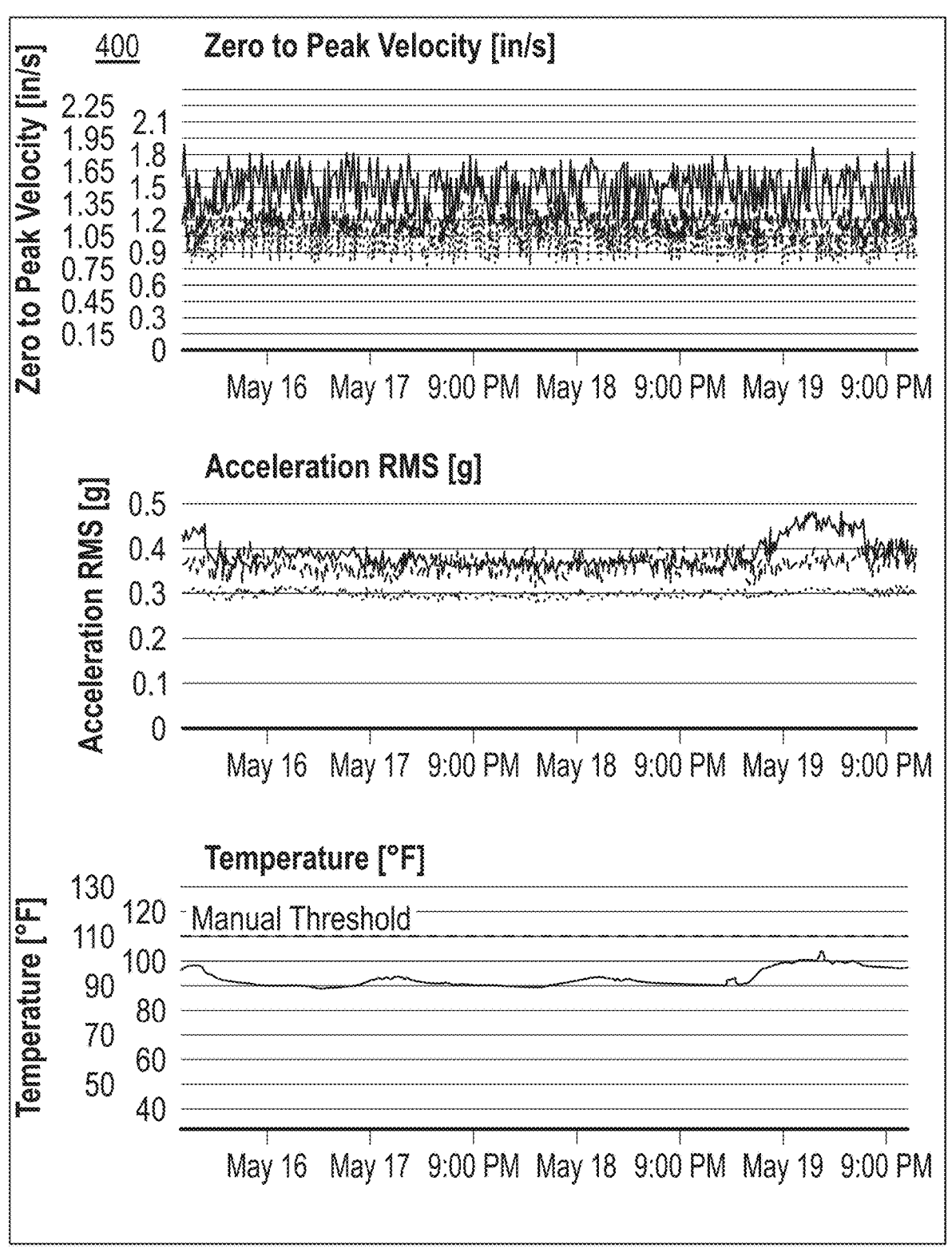
FIG. 4. illustrates an exemplary user interface depicting time series data generated by an attached sensor device to a physical machine.

FIG. 4. illustrates an exemplary user interface 400 depicting time series data generated by an attached sensor device to a physical machine. In some embodiments, the system generates a user interface depicting time-series data obtained from the sensor device. In this example, the user interface 400 depicts data collected over many days by a sensor device attached to a physical equipment. Here the data shows zero to peak velocity data, acceleration RMS data, and temperature data.

Figure 5:
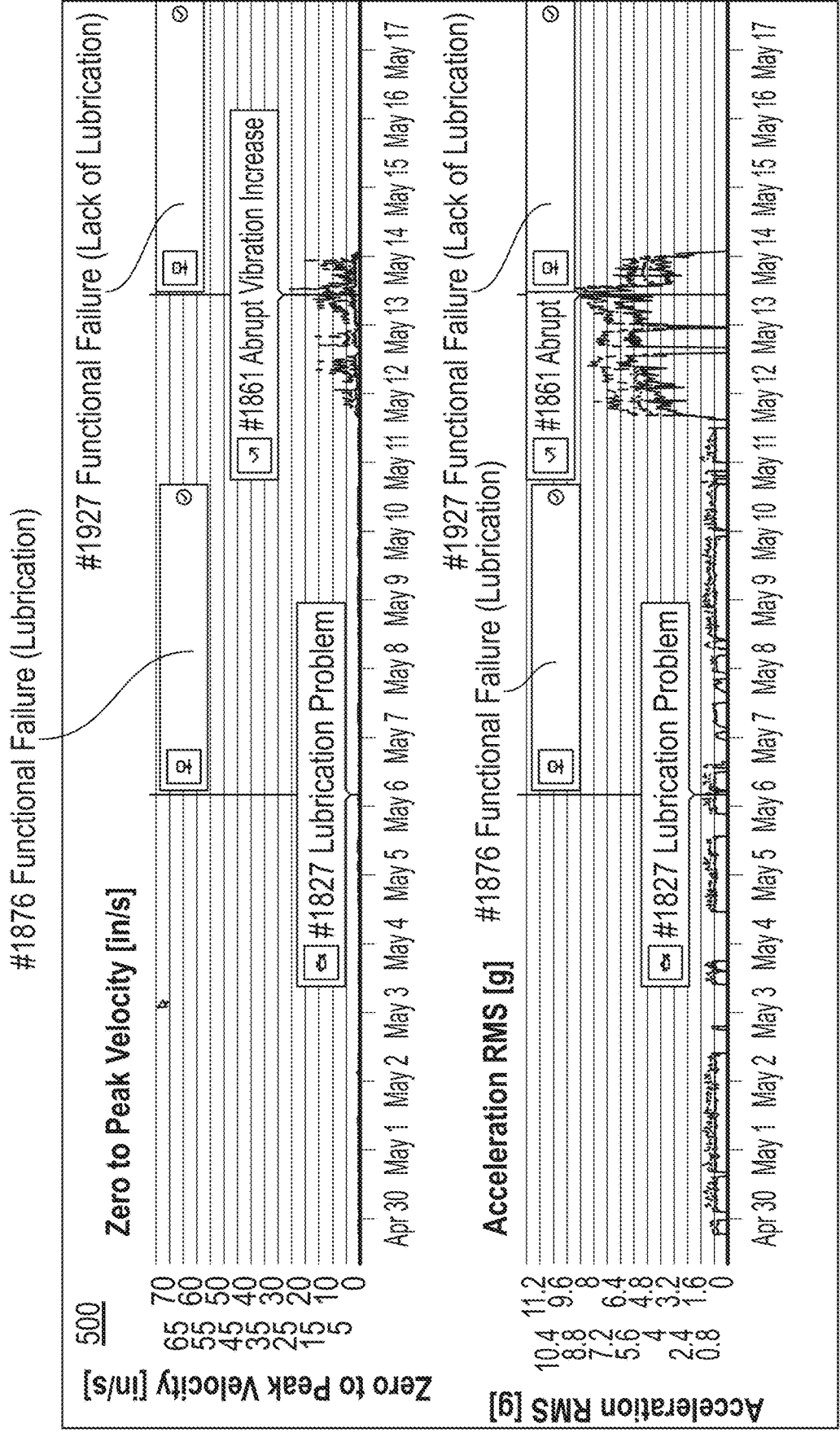
FIG. 5 illustrates an exemplary user interface depicting time series data and the occurrence of an operation anomaly of a physical machine.

FIG. 5 illustrates an exemplary user interface 500 depicting time series data and the occurrence of an operation anomaly of a physical machine. In some embodiments, the system generates a user interface 500 depicting time-series data obtained from the sensor device. In this example, the system evaluates the received sensor data of the physical machine and determines one or more operational anomalies of the physical machine. The system may classify and label the time-series data indicating a specific type of anomaly identified by the system. In some embodiments, the system uses one more trained machine learning models that are trained to identify or predict the occurrence of specific types of anomalies. As depicted in the example user interface, the system has determined a lubrication problem and a functional failure of the monitored physical machine.

Figure 6:
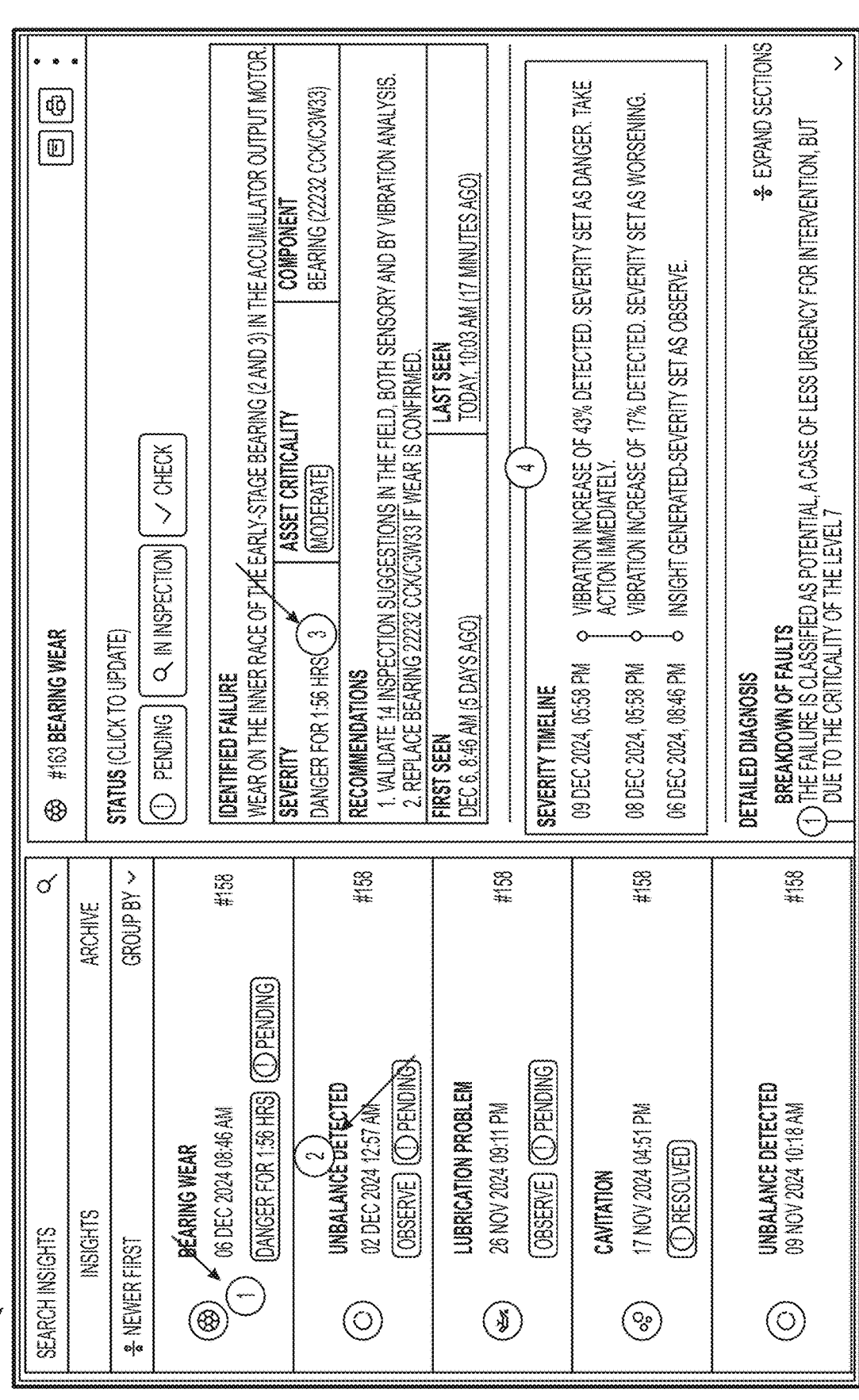
FIG. 6 illustrates an exemplary user interface depicting occurrences of anomalies for a particular physical machine.

FIG. 6 illustrates an exemplary user interface 600 depicting occurrences of anomalies for a particular physical machine. In some embodiments, that system generates a user interface 600 that allows a user to review state and/or detected anomalies of a monitored physical machine. In a portion of the user interface provides a listing of detected anomalies of the monitored physical machine. For example, the listing shows a bearing wear anomaly, an unbalance anomaly, a lubrication anomaly, a cavitation anomaly and another unbalance anomaly.

The user interface 600 may receive an input selecting one of the listed anomalies. In response to the selection, another portion of the user interface depicts additional details about the selected anomalies. This detailed portion of the user interface allows for the input of a status regarding the anomaly. For example, a user may select a pending status, an inspection status or a checking status. This functionality allows a user to track and mange the particular anomaly of the physical machine.

The user interface 600 also provides system generated information about the anomaly based on the continued evaluation of the received sensor data from the attached sensor device 100. For example, the system determines the identified failure and provides a description. The system determines a severity level and a time duration associated with the severity. The system may generation one more recommendation about how to address the identified anomaly. The system may identify the first time the anomaly was detected and the last time the particular anomaly was detected by the system.

Additionally, the system may determine, based on the received sensor data, a severity timeline indication changes in the data. For example, a percentage change of an increase or decrease in the vibration of the physical machine may be determined by the system.

Figure 7:
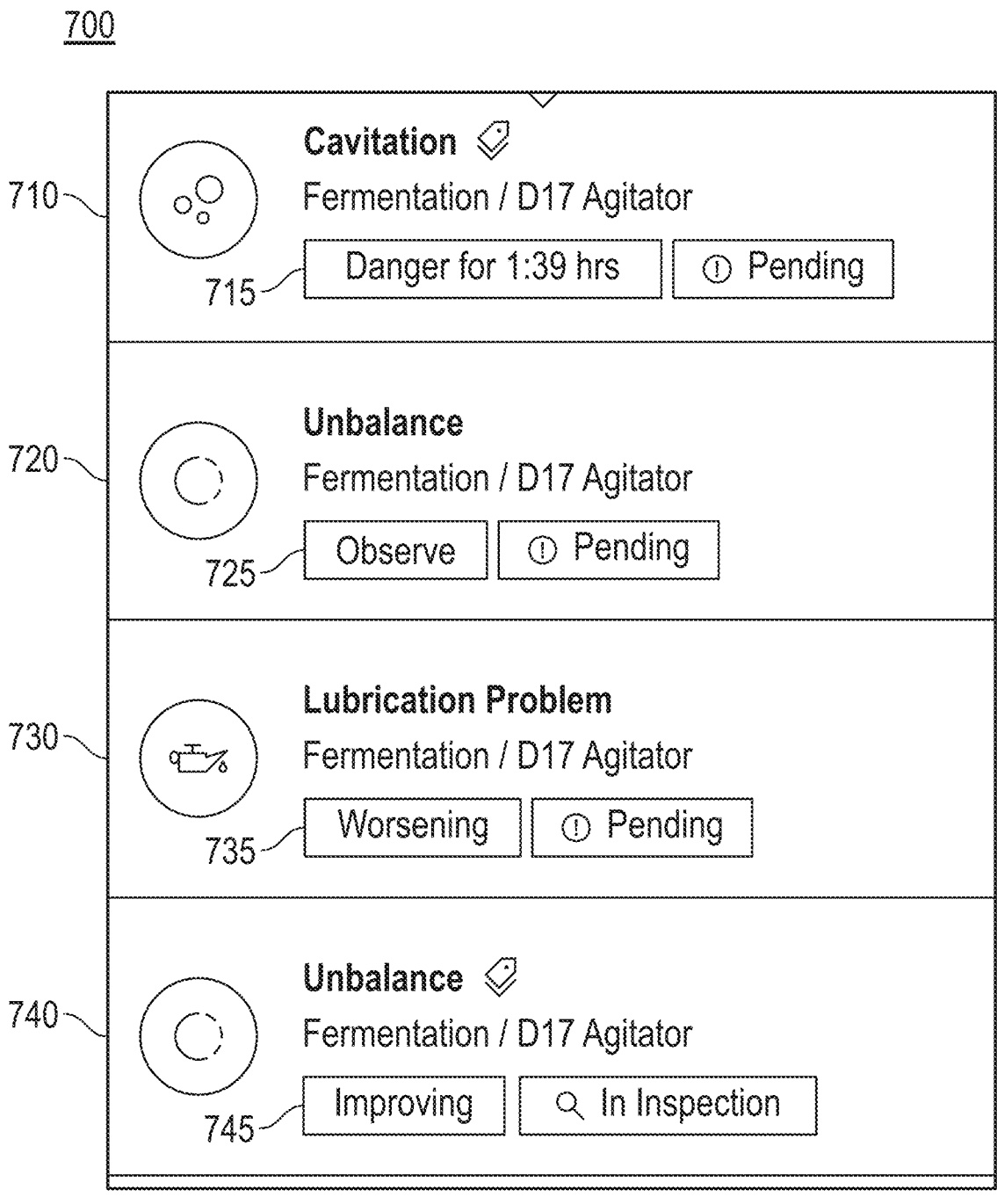
FIG. 7 illustrates exemplary determined equipment condition states for a particular physical machine that is being monitored by an attached sensor.

FIG. 7 illustrates exemplary determined equipment condition states 700 for a particular physical machine that is being monitored by an attached sensor. While periodically evaluating the sensor data obtained from a sensor device attached to a particular machine, the system executes a state machine and/or determines a condition or state of the physical machine. Not only does the system determine or predict an anomaly of the physical machine, but the system automatically assesses a change in the condition of the determined or predicted anomaly.

Examples of determined anomalies are described with respect to a detected cavitation anomaly 710, an unbalance anomaly 720, a lubrication anomaly 730, and the unbalance anomaly. The described detected anomalies are for illustrative purposes and are not inclusive of all of the anomalies that the system may determine based on the obtained data from the sensor device 100.

The condition state indicates a system determined state for the determined anomaly at a particular point in time. For example, the determined condition state for the cavitation anomaly 710 is the condition state of danger 715. The determined condition state for the unbalance anomaly 720 is an observe condition state 725. The determined condition state for the lubrication anomaly 730 is worsening 735. The determined condition state for the unbalance anomaly 740 is improving.

FIG. 8 is a process flow chart illustrating an exemplary method 800 that may be performed in some embodiments. The exemplary method 800 illustrates a process of obtaining sensor data from a sensor device attached to a physical machine. The system periodically receives the sensor data over a period of time. The system periodically evaluates the received sensor data and also determines the occurrence of an anomaly. While periodically evaluating the received sensor data, the system also determines a condition state. In other words, the system also determines how the condition of the determined anomaly is changing over time.

In step 810, the system assigns an initial condition state to the obtained data associated with a sensor device 100.

In step 820, one or more servers, receive sensor data obtained from the sensor device 100.

In step 830, the received sensor data is evaluated via one or more trained machine learning models.

In step 840, the system determines whether to change the current condition state to a new condition state.

In step 850, the system transitions from the current condition state to the new condition state.

In step 860, the system generates a user interface with an indication of the new condition state. The process of step 820-860 iteratively continues. During this iterative process, the condition state may change multiple times.

FIG. 9 illustrates a table description exemplary equipment states and monitoring time for the condition state. The table describes how different condition states may change from a current state to a new state. A description associated with the type of change is associated the state change. For example, an Observe state may change to a Worsening state, a Danger state or an improving state. A predetermined amount of time may be associated with the change from a current state to a new state where the received sensor data from the sensor device is periodically obtained such a sufficient amount of time has occurred to confirm the change of the state. For example, when starting at the Observe state and to move to the Worsening state, in this example, a set period of minimum time of collecting data from the sensor device 100 is set at a minimum amount of time of 24 hours. Where to change from the Observe state and to move to the Danger state, a set period of a minimum time of collecting data from the sensor device 100 is set at a minimum amount of time of 2 hours.

In some embodiments, the system requires that a confidence level of a predetermined confidence level must be met or exceeded to confirm that the state is actually changing from one state to another. In the example of change from an Observe state to the Worsening state, a confidence level of 65% that the Worsening state is actually occurring must be must. To determine the confidence level of the new state, the system evaluates the received sensor data and determines a confidence value for a change to a new state. After the state has changed to the new state, then an indication of the new state may be displayed via the user interface as depicted in FIG. 6.

Figure 10:
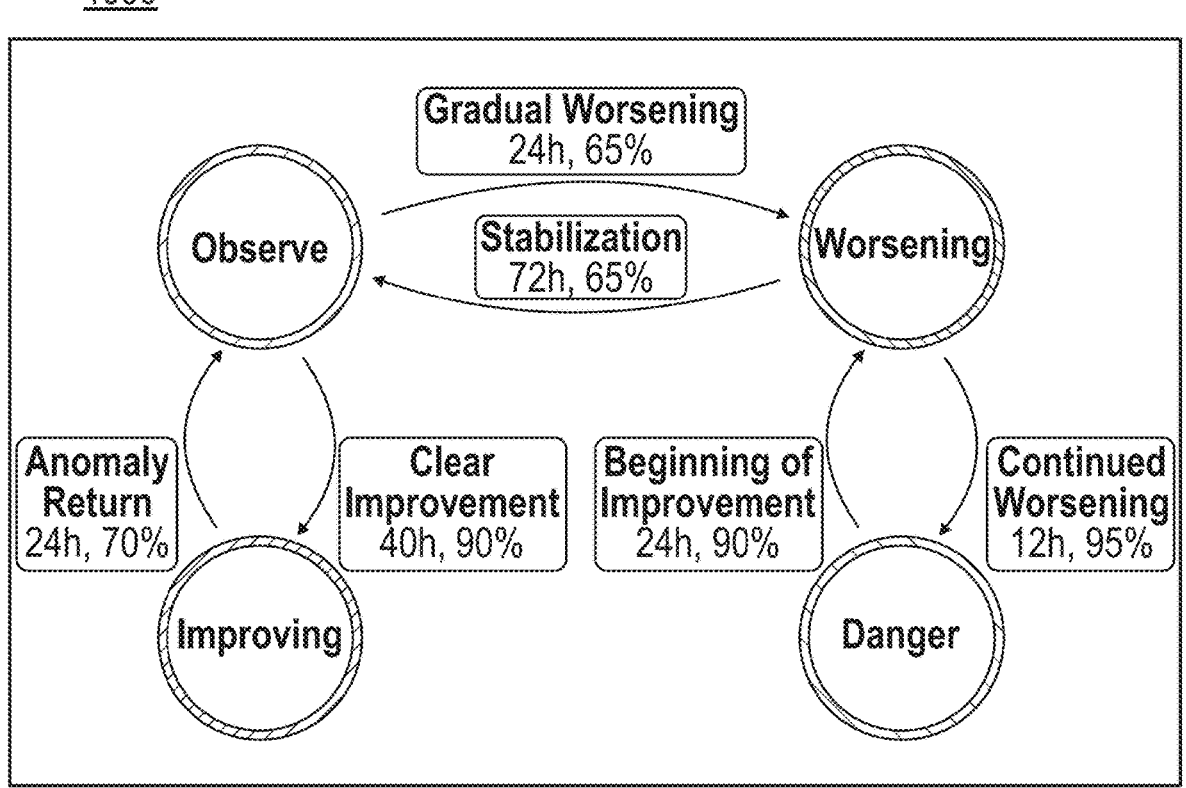
FIG. 10 illustrates an example of the operation of a state determination process to determine the condition state for a physical machine.

FIG. 10 illustrates an example of the operation of a state determination process to determine the condition state for a physical machine. This diagram illustrates an example of states for a determined anomaly changing from one state to another state. To move from one state to another state, exemplary predetermined values for the amount of time and the predetermined confidence level is depicted. For example, to move from the Observe state to the Worsening state an amount of time that must pass is set at 24 hours since the Observe state was set. Also, a confidence level of at least 65% of that a Worsening state is actually occurring must be met. To move from the Worsening state to the Observe state an amount of time that must pass is set at 72 hours since the Worsening state was set. Also, a confidence level of at least 65% that an Observe state is actually occurring must be met.

In some embodiments, after determining an anomaly and assigning a state in association with the determined anomaly, one or more machine learning models receive additional data obtained by the installed sensor. In some embodiments, two or more sensors are attached to the physical machine and the multiple sensors obtain the sensor data. The system follows the progression of the determined anomaly to identify a change in the anomaly. In some embodiments, the system evaluates the received new sensor data to determine whether the received data indicates that a change of the anomaly is occurring. The system requires that a predetermined confidence level must be met for a change in state to occur. For example, the system may determine a metric value that indicates how the received data is changing over time. If the received data is determined to change significantly or erratically over a set period of time, then the system may determine a low confidence level that a change is actually occurring from one state to another state. However, if the received data is determined to more stably or continuously change, then the system may determine a high confidence level that a change is actually occurring from one state to another state. The system may use different data smoothness evaluation methods to determine trends or patterns in the received data. These methods (such as determining standard deviation of data differences, long-run v. short-run variance determination, lag-one autocorrelation, determining moving averages, residual analysis, etc.) may consider time-series data and which may contain noise or volatility. In response to a predetermined confidence level being met, the system may change the then current state to another state. To change from different states, different predetermined confidence level may be configured.

In some embodiments, when a state changes to a new state, then the system generates the configuration file and/or commands that are transmitted to the sensor device 100. The generated configuration file and/or commands instruct the sensor device to change (increase or decrease) the sampling rate or frequency of the sensor device, the rate at which the sensor device transmits obtained sensor data from the sensor device, the resolution or level of detail of the data obtained by the sensor device. Additionally, when completing a change from a Worsening state, Danger state or an Improving state, the system may generate a configuration file and/or commands that are transmitted to the sensor device 100 instructing the sensor device 100 resume normal data acquisition operations.

While the embodiments are described in relation to the available hardware and software components of the maintenance and monitoring infrastructure, the embodiments are not only limited to the environment of the infrastructure. For example, they can be implemented in a computer or a processor environment.

Figure 11:
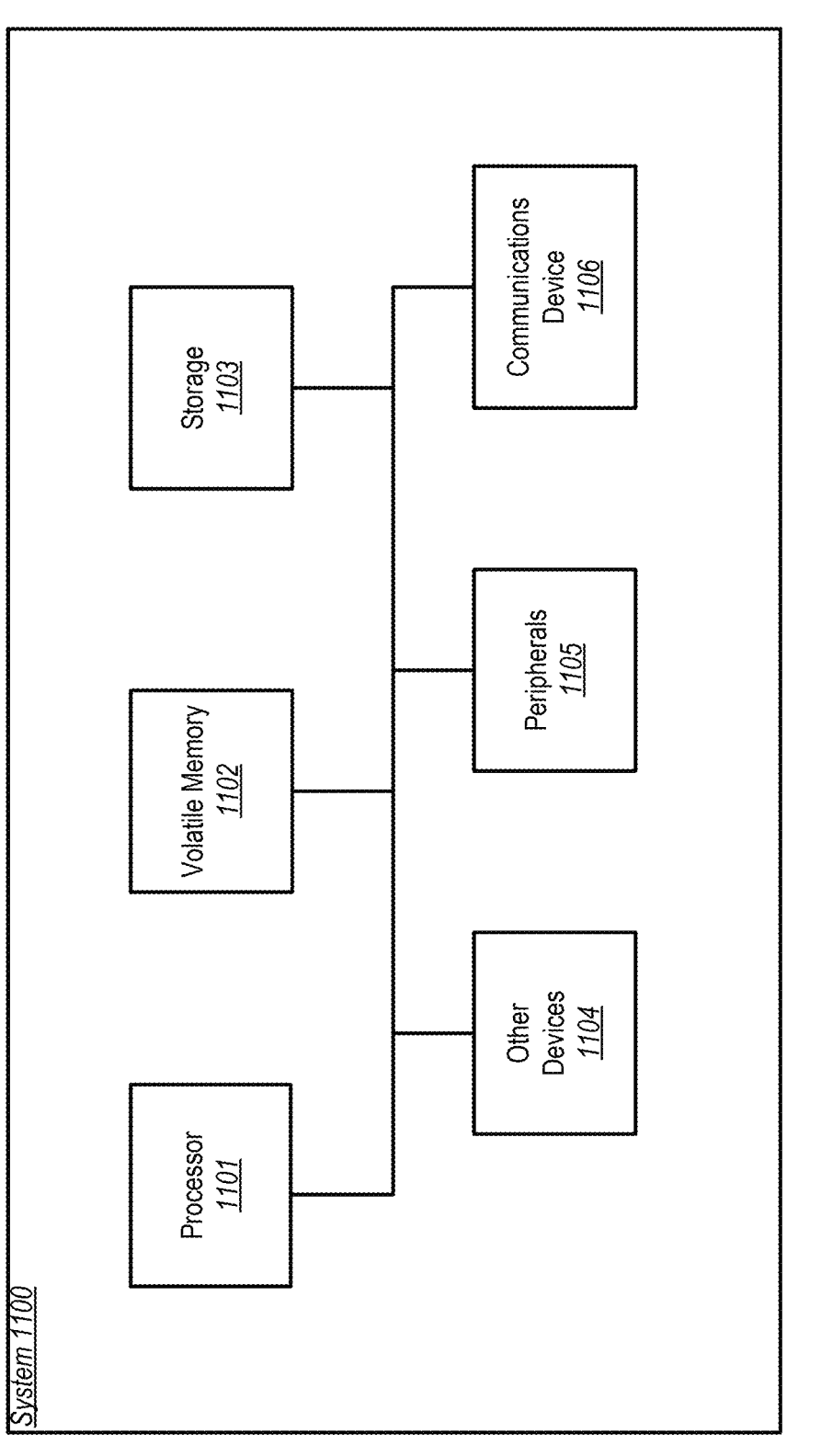
FIG. 11 is a diagram illustrating an exemplary computer that may perform processing in some embodiments.

FIG. 11 is a diagram illustrating an exemplary computer 1100 that may perform processing in some embodiments. Processor 1101 may perform computing functions such as running computer programs. The volatile memory 1102 may provide temporary storage of data for the processor 1101. RAM is one kind of volatile memory. Volatile memory typically requires power to maintain its stored information. Storage 1103 provides computer storage for data, instructions, and/or arbitrary information. Non-volatile memory, which can preserve data even when not powered and including disks and flash memory, is an example of storage. Storage 1103 may be organized as a file system, database, or in other ways. Data, instructions, and information may be loaded from storage 1103 into volatile memory 1102 for processing by the processor 1101.

The computer 1100 may include peripherals 1105. Peripherals 1105 may include input peripherals such as a keyboard, mouse, trackball, video camera, microphone, and other input devices. Peripherals 1105 may also include output devices such as a display. Communications device 1106 may connect the computer 1100 to an external medium. For example, communications device 1106 may take the form of a network adapter that provides communications to a network. A computer 1100 may also include a variety of other devices 1104. The various components of the computer 1100 may be connected by a connection medium such as a bus, crossbar, or network.

Examples

It will be appreciated that the present disclosure may include any one and up to all of the following examples.

Example 1. A computer-implemented method comprising: receiving from a sensor device that is attached to a physical equipment, data generated by the attached sensor device, wherein the attached sensor device is configured to periodically generate data and transmit the generated data to a computing device, and wherein the generated data includes a timestamp for each respective occurrences of the generated data; periodically receiving, via one or more servers, the generated data by the attached sensor device; storing the generated data in a data repository the generated data, wherein the data repository includes generated data obtained from multiple different sensors each attached to a respective different physical equipment; determining based on the periodically received generated data, the occurrence of one or more anomalies associate with the physical equipment; determining a condition state associated with the physical equipment, wherein the condition state is determined by one or more trained machine learning models that receive as an input the generated periodically received generated data; generating a user interface comprising a first portion depicting the determined one or more anomalies and the condition state, and a second portion depicting detailed information associated with an input selection, via the user interface, of one of the one or more anomalies; periodically receiving, by the one or more servers, additional data generated by the attached sensor device; evaluating, at least in part, the additional data generated by the attached sensor device, to determine that the condition state associated with the physical equipment has changed to a different condition state, wherein the evaluation is performed by the one or more trained machine learning model that receive as an input the additional data generated by the attached sensor device; and generating a user interface wherein a first portion depicting the determined one or more anomalies, and a describes the different condition state.

Example 2. The computer-implemented method of Example 1, wherein the change of the condition state is a change from an initial observe state to a worsening state indicating a gradual worsening of the determined one or more anomalies.

Example 3. The computer-implemented method of any one of Examples 1-2, wherein the change of the condition state is a change from the worsening state to the observe state indicating a stabilization of the determined one or more anomalies.

Example 4. The computer-implemented method of any one of Examples 1-3, wherein the change of the condition state is a change from a worsening state to a danger state indicating a continued worsening of the determined one or more anomalies.

Example 5. The computer-implemented method of any one of Examples 1-4, wherein the change of the condition state is a change from the danger state to the observe state indicating a significant improvement of the determined one or more anomalies.

Example 6. The computer-implemented method of any one of Examples 1-5, wherein the change of the condition state requires that a predetermined amount of time has passed since the condition state was determined in order to change from the condition state to the different condition state.

Example 7. The computer-implemented method of any one of Examples 1-6, wherein the change of the condition state requires that a predetermined threshold confidence level has been established that the condition state is actually changing to the different condition state.

Example 8. The computer-implemented method of any one of Examples 1-7, wherein the change of the condition state is a change from the danger state to the observe state indicating a significant improvement of the determined one or more anomalies.

Example 9. The computer-implemented method of any one of Examples 1-8, wherein over a period of time, the condition state changes from an initial condition state to a second condition state, the second condition state changes to a third condition state, and the third condition state changes back to the second condition state, and the second condition state changes to the initial condition state.

Example 10. The computer-implemented method of any one of Examples 1-9, further comprising: based on a change of the determined state, generating a configuration file and/or a command for transmission to the attached sensor device; receiving by the attached sensor device, the generated configuration file or command; and based on the received generated configuration file or command, an operation of the sensor device that increases or reduces the sampling rate of the attached sensor device.

Example 11. A physical equipment monitoring system, comprising: multiple sensor devices, each attached to separate physical equipment, wherein each of the multiple sensor devices comprise an accelerometer and a thermal sensor, and wherein each attached sensor device is configured to periodically generate data and transmit the generated data to a computing device, and wherein the generated data includes a timestamp for each respective occurrences of the generated data, and wherein the sensor device is configured to receive remote configuration files and/or command to change operational functionality of the sensor device; and one or more servers, comprising one or more non-transitory computer-readable media storing computer-executable instructions that, when executed on one or more processors, cause the one or more processors to perform operations: receiving, via the one or more servers, from each of the multiple sensor devices, data generated by the attached sensor devices; storing the generated data in a data repository, wherein the data repository includes generated data obtained from the multiple different sensors; determining, via the one or more servers, based on periodically received generated data for a first sensor device of the of the multiple sensor devices, the occurrence of one or more anomalies associate with a first physical equipment being monitored by the first sensor device; determining, via the one or more servers, a condition state associated with the first physical equipment, wherein the condition state is determined by one or more trained machine learning models that receive as an input, at least a portion of the periodically received generated data generated by the first sensor device; generating, via the one or more servers, a user interface comprising a first portion depicting the determined one or more anomalies and the condition state, and a second portion depicting detailed information associated with an input selection, via the user interface, of one of the one or more anomalies; periodically receiving, by the one or more servers, additional data generated by the first sensor device; evaluating, at least in part, the additional data generated by the first sensor device, to determine that the condition state associated with the first physical equipment has changed to a different condition state, wherein the evaluation is performed by the one or more trained machine learning model that receive as an input the additional data generated by the first sensor device; and generating a user interface wherein a first portion depicting the determined one or more anomalies, and a describes the different condition state.

Example 12. The monitoring system of Example 11, wherein the change of the condition state is a change from an initial observation state to a worsening state indicating a gradual worsening of the determined one or more anomalies.

Example 13. The monitoring system of any one of Examples 11-12, wherein the change of the condition state is a change from the worsening state to the observe state indicating a stabilization of the determined one or more anomalies.

Example 14. The monitoring system of any one of Examples 11-13, wherein the change of the condition state is a change from a worsening state to a danger state indicating a continued worsening of the determined one or more anomalies.

Example 15. The monitoring system of any one of Examples 11-14, wherein the change of the condition state is a change from the danger state to the observe state indicating a significant improvement of the determined one or more anomalies.

Example 16. The monitoring system any one of Examples 11-15, wherein the change of the condition state requires that a predetermined amount of time has passed since the condition state was determined in order to change from the condition state to the different condition state.

Example 17. The monitoring system of any one of Examples 11-16, wherein the change of the condition state requires that a predetermined threshold confidence level has been established that the condition state is actually changing to the different condition state.

Example 18. The monitoring system of any one of Examples 11-17, wherein the change of the condition state is a change from the danger state to the observe state indicating a significant improvement of the determined one or more anomalies.

Example 19. The monitoring system of any one of Examples 11-18, wherein over a period of time, the condition state changes from an initial condition state to a second condition state, the second condition state changes to a third condition state, and the third condition state changes back to the second condition state, and the second condition state changes to the initial condition state.

Example 20. The monitoring system of any one of Examples 11-19, further comprising: based on a change of the determined state, generating a configuration file and/or a command for transmission to the first sensor device; receiving by the attached sensor device, the generated configuration file or command; and based on the received generated configuration file or command, an operation of the sensor device that increases or reduces the sampling rate of the first sensor device.

What is claimed is:

1. A computer-implemented method comprising:

receiving from a sensor device that is attached to a physical equipment, data generated by the attached sensor device, wherein the attached sensor device is configured to periodically generate data and transmit the generated data to a computing device, and wherein the generated data includes a timestamp for each respective occurrences of the generated data;

periodically receiving, via one or more servers, the generated data by the attached sensor device;

storing the generated data in a data repository the generated data, wherein the data repository includes generated data obtained from multiple different sensors each attached to a respective different physical equipment;

determining based on the periodically received generated data, the occurrence of one or more anomalies associate with the physical equipment;

determining a condition state associated with the physical equipment, wherein the condition state is determined by one or more trained machine learning models that receive as an input the generated periodically received generated data;

generating a first user interface depicting the determined one or more anomalies and the condition state, and depicting detailed information associated with an input selection, via the first user interface, of one of the one or more anomalies;

based on a change of the determined condition state, generating a configuration file and/or a command for transmission to the attached sensor device;

receiving by the attached sensor device, the generated configuration file and/or command;

based on the received generated configuration file and/or command, changing a sampling parameter of the attached sensor device to control the operation of the attached sensor device operation, wherein the sampling parameter includes any one of a sampling interval, a sampling frequency, a sampling rate, a sampling range or a sampling resolution;

operating the attached sensor device according to the changed sampling parameter;

periodically receiving, by the one or more servers, additional data generated by the attached sensor device;

evaluating, at least in part, the additional data generated by the attached sensor device, to determine that the condition state associated with the physical equipment has changed to a different condition state, wherein the evaluation is performed by the one or more trained machine learning model that receive as an input the additional data generated by the attached sensor device; and generating a second user interface depicting the determined one or more anomalies, and depicting information indicative of the different condition state.

2. The computer-implemented method of claim 1, wherein the change of the condition state is a change from an initial observe state to a worsening state indicating a gradual worsening of the determined one or more anomalies.

3. The computer-implemented method of claim 2, wherein the change of the condition state is a change from the worsening state to the observe state indicating a stabilization of the determined one or more anomalies.

4. The computer-implemented method of claim 1, wherein the change of the condition state is a change from a worsening state to a danger state indicating a continued worsening of the determined one or more anomalies.

5. The computer-implemented method of claim 4, wherein the change of the condition state is a change from the danger state to the observe state indicating a significant improvement of the determined one or more anomalies.

6. The computer-implemented method of claim 1, wherein the change of the condition state requires that a predetermined amount of time has passed since the condition state was determined in order to change from the condition state to the different condition state.

7. The computer-implemented method of claim 6, wherein the change of the condition state requires that a predetermined threshold confidence level has been established that the condition state is actually changing to the different condition state.

8. The computer-implemented method of claim 4, wherein the change of the condition state is a change from the danger state to the observe state indicating a significant improvement of the determined one or more anomalies.

9. The computer-implemented method of claim 1, wherein over a period of time, the condition state changes from an initial condition state to a second condition state, the second condition state changes to a third condition state, and the third condition state changes back to the second condition state, and the second condition state changes to the initial condition state.

10. The computer-implemented method of claim 1, wherein the attached sensor device is configured to operate in a hibernation mode to reduce battery consumption and conserve battery power, and wherein the attached sensor device is configured to periodically exit the hibernation mode according to the received generated configuration file and/or command.

11. A physical equipment monitoring system, comprising:

multiple sensor devices, each attached to separate physical equipment, wherein each of the multiple sensor devices comprise an accelerometer and a thermal sensor, and wherein each attached sensor device is configured to periodically generate data and transmit the generated data to a computing device, and wherein the generated data includes a timestamp for each respective occurrences of the generated data, and wherein the sensor device is configured to receive remote configuration files and/or command to change operational functionality of the sensor device; and one or more servers, comprising one or more non-transitory computer-readable media storing computer-executable instructions that, when executed on one or more processors, cause the one or more processors to perform operations:

receiving, via the one or more servers, from each of the multiple sensor devices, data generated by the attached sensor devices;

storing the generated data in a data repository, wherein the data repository includes generated data obtained from the multiple different sensors;

determining, via the one or more servers, based on periodically received generated data for a first sensor device of the of the multiple sensor devices, the occurrence of one or more anomalies associate with a first physical equipment being monitored by the first sensor device;

determining, via the one or more servers, a condition state associated with the first physical equipment, wherein the condition state is determined by one or more trained machine learning models that receive as an input, at least a portion of the periodically received generated data generated by the first sensor device;

generating, via the one or more servers, a first user interface depicting the determined one or more anomalies and the condition state, and depicting detailed information associated with an input selection, via the first user interface, of one of the one or more anomalies; and based on a change of the determined condition state, generating a configuration file and/or a command for transmission to the first sensor device;

wherein the first sensor device is configured to perform the operations of:

receiving by the first sensor device, the generated configuration file and/or command;

based on the received generated configuration file and/ or command, changing a sampling parameter of the first sensor device to control the operation of the first sensor device operation, wherein the sampling parameter includes any one of a sampling interval, a sampling frequency, a sampling rate, a sampling range or a sampling resolution; and operating the first sensor device according to the changed sampling parameter;

wherein the one or more processors further perform the operations of:

periodically receiving, by the one or more servers, additional data generated by the first sensor device;

evaluating, at least in part, the additional data generated by the first sensor device, to determine that the condition state associated with the first physical equipment has changed to a different condition state, wherein the evaluation is performed by the one or more trained machine learning model that receive as an input the additional data generated by the first sensor device; and generating a second user interface depicting the determined one or more anomalies, and depicting information indicative of the different condition state.

12. The monitoring system of claim 11, wherein the change of the condition state is a change from an initial observation state to a worsening state indicating a gradual worsening of the determined one or more anomalies.

13. The monitoring system of claim 12, wherein the change of the condition state is a change from the worsening state to the observe state indicating a stabilization of the determined one or more anomalies.

14. The monitoring system of claim 11, wherein the change of the condition state is a change from a worsening state to a danger state indicating a continued worsening of the determined one or more anomalies.

15. The monitoring system of claim 14, wherein the change of the condition state is a change from the danger state to the observe state indicating a significant improvement of the determined one or more anomalies.

16. The monitoring system of 11, wherein the change of the condition state requires that a predetermined amount of time has passed since the condition state was determined in order to change from the condition state to the different condition state.

17. The monitoring system of claim 16, wherein the change of the condition state requires that a predetermined threshold confidence level has been established that the condition state is actually changing to the different condition state.

18. The monitoring system of claim 14, wherein the change of the condition state is a change from the danger state to the observe state indicating a significant improvement of the determined one or more anomalies.

19. The monitoring system of claim 11, wherein over a period of time, the condition state changes from an initial condition state to a second condition state, the second condition state changes to a third condition state, and the third condition state changes back to the second condition state, and the second condition state changes to the initial condition state.

20. The monitoring system of claim 11, wherein each of the first sensor is configured to operate in a hibernation mode to reduce battery consumption and conserve battery power, and wherein the first sensor is configured to periodically exit the hibernation mode according to the received configuration file.

* * * * *